(12) United States Patent
Suzuki et al.

(10) Patent No.: US 7,575,774 B2
(45) Date of Patent: Aug. 18, 2009

(54) FILM FORMATION METHOD AND ORIENTATION FILM FORMATION METHOD

(75) Inventors: Katsumi Suzuki, Nagano (JP); Kohei Ishida, Nagano (JP); Yoshikazu Hama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/019,995

(22) Filed: Jan. 25, 2008

(65) Prior Publication Data

US 2008/0187653 A1 Aug. 7, 2008

(30) Foreign Application Priority Data

Feb. 5, 2007 (JP) .............................. 2007-025143

(51) Int. Cl.
*B05D 5/12* (2006.01)
(52) U.S. Cl. ........................................................ 427/58
(58) Field of Classification Search .................... 427/58, 427/256
See application file for complete search history.

(56) References Cited

U.S. PATENT DOCUMENTS 6,599,582 B2 * 7/2003 Kiguchi et al. .............. 427/466
6,810,814 B2 * 11/2004 Hasei ......................... 101/485
7,438,944 B2 10/2008 Masuda
2007/0046718 A1 * 3/2007 Shintate et al. ............... 347/21

FOREIGN PATENT DOCUMENTS

| JP | 2005-000721 A | 1/2005 |
| JP | 2005-013877 A | 1/2005 |
| JP | 2005-028314 A | 2/2005 |
| JP | 3705281 B | 8/2005 |
| JP | 2005-305337 A | 11/2005 |

* cited by examiner

*Primary Examiner*—Roberts Culbert
(74) *Attorney, Agent, or Firm*—Global IP Counselors, LLP

(57) ABSTRACT

In a film formation method, a droplet discharge unit discharges droplets of a functional liquid material on a substrate as the droplet discharge unit is moved with respect to the substrate to form a liquid film on the substrate. The film formation method includes discharging a plurality of first droplets onto a plurality of first positions on the substrate with the first positions being arranged so that the first droplets do not touch each other on the substrate, discharging a plurality of second droplets onto a plurality of second positions on the substrate with the second positions being disposed between the first droplets that were discharged on the substrate; and causing the second droplets to touch a plurality of adjacent ones of the first droplets to form the liquid film.

9 Claims, 9 Drawing Sheets

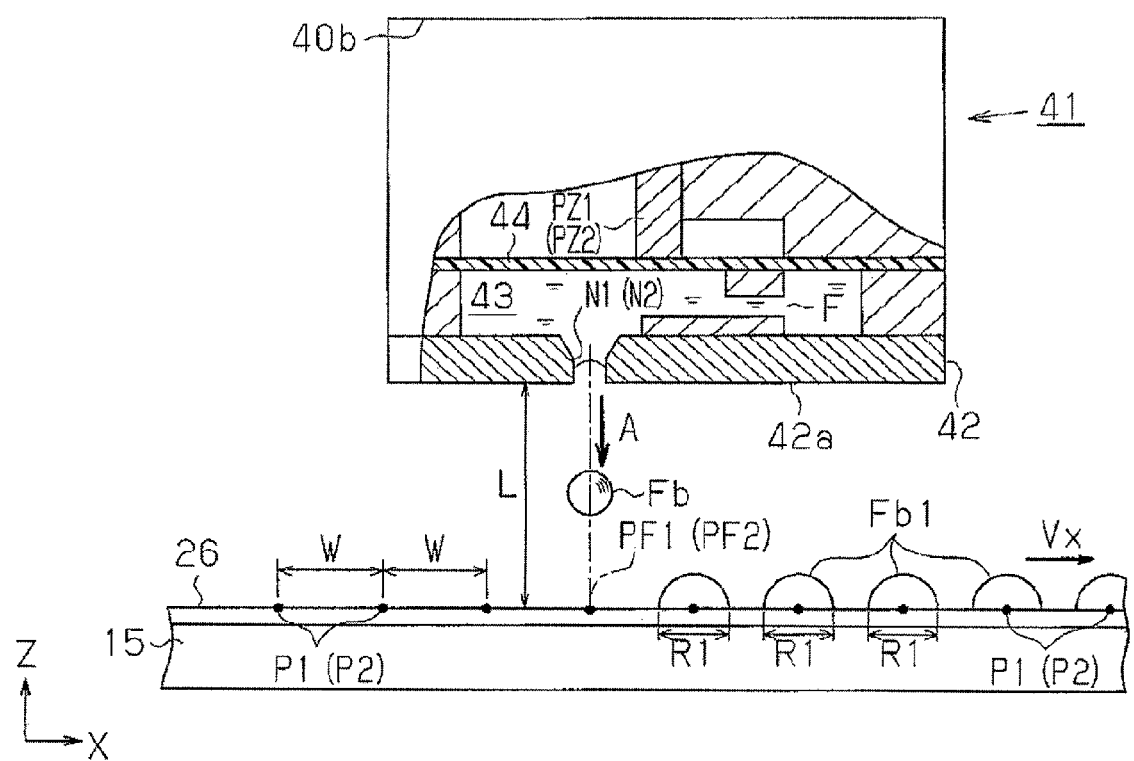
F I G. 5

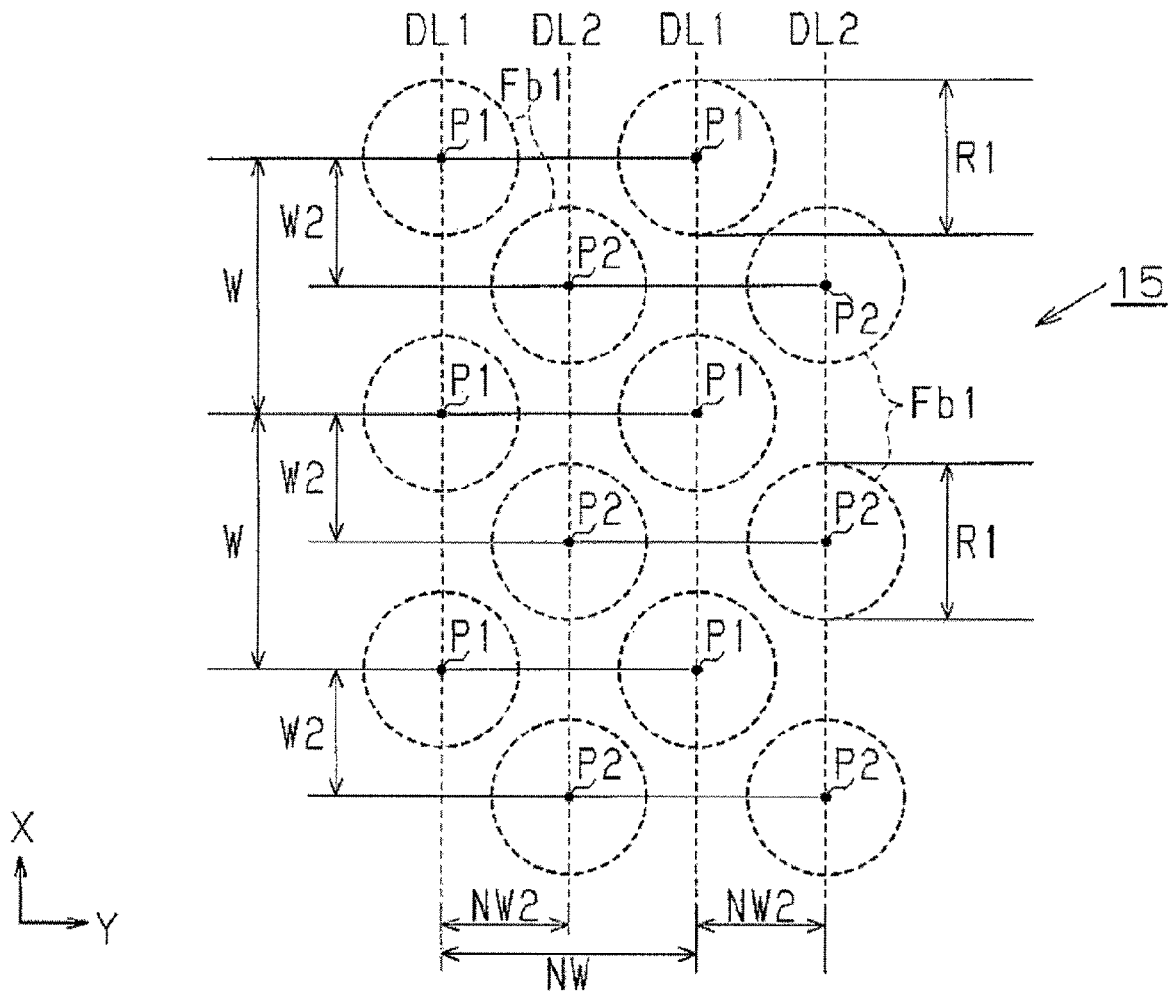
F I G. 6

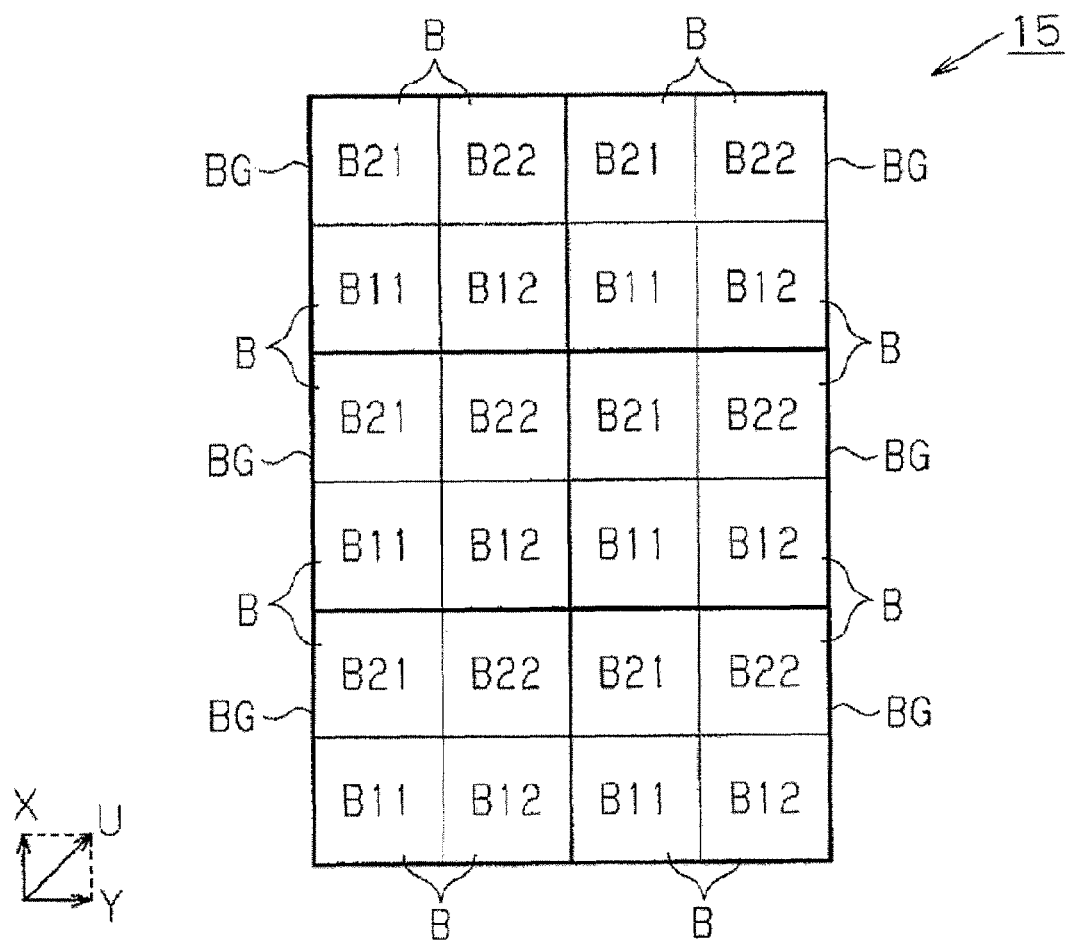
F I G. 7

FILM FORMATION METHOD AND ORIENTATION FILM FORMATION METHOD

CROSS-REFERENCE TO RELATED APPLICATIONS

This application claims priority to Japanese Patent Application No. 2007-025143 filed on Feb. 5, 2007. The entire disclosure of Japanese Patent Application No. 2007-025143 is hereby incorporated herein by reference.

BACKGROUND

1. Technical Field

The present invention relates to a film formation method, and to an orientation film formation method.

2. Related Art

In a liquid crystal display device, liquid crystals are sealed between an element substrate and an opposing substrate via a seal member. Orientation films for orienting the liquid crystals are formed on the surfaces of the element substrate and the opposing substrate that are adjacent to the liquid crystals. The orientation films are formed on substantially the entire surfaces of the element substrate and the opposing substrate, and an inkjet method is included as one method for forming the orientation films. In the inkjet method, droplets discharged on a substrate are allowed to coalesce with each other to form an orientation film pattern on the substrate. However, the droplets discharged on the substrate sometimes do not spread uniformly on the substrate. For example, the droplets contract to form stripes, droplets are attracted by other droplets to form bulges, and other problems occur, and a uniform orientation film is difficult to form.

Therefore, a film formation method has been proposed for forming a uniform thin film from droplets that are discharged by an inkjet method (for example, Japanese Laid-Open Patent Application Publication No. 2005-0721). In Japanese Laid-Open Patent Application Publication No. 2005-0721, a head having a plurality of nozzles used in an inkjet method is provided, and when the substrate is driven in the Y direction, liquid dots having a diameter of r are applied on the substrate continuously in the Y direction, and at intervals of 4r in the X direction. The liquid is applied from the head in an arrangement in which a second dot is applied adjacent to one first dot that is applied first, and then a third dot is applied adjacent to the second dot, and a fourth dot is applied adjacent to the third dot so that the fourth dot is adjacent to another first dot. At this time, a uniform film thickness in the X direction is obtained by giving the first dot a small size, the second dot an intermediate size, the third dot a large size, and the fourth dot an intermediate size. In other words, when the dots are the same size, adjacent dots are attracted to each other, and the film thickness easily becomes greater on the side in which dots are previously applied adjacent to each other than on the side in which dots are subsequently applied, and measures are taken to prevent this phenomenon.

In view of the above, it will be apparent to those skilled in the art from this disclosure that there exists a need for an improved film formation method and orientation film formation method. This invention addresses this need in the art as well as other needs, which will become apparent to those skilled in the art from this disclosure.

SUMMARY

However, in the above mentioned publication, the dots applied continuously in the Y direction first cannot be prevented from coalescing with each other in the Y direction and contracting in the X direction. It is also impossible to prevent the dots applied so as to be adjacent to the previous dots from being attracted by the previous dots. Furthermore, the sizes of the applied dots must be varied in the X direction, and increased complexity of the control device or the structure of the head could not be avoided.

The present invention was developed to overcome the problems described above, and an object of the present invention is to provide a film formation method for satisfactorily causing a plurality of droplets discharged on a substrate to coalesce and form a liquid film having a uniform thickness, and to provide an orientation film formation method.

A film formation method of the first aspect of the invention is a film formation method in which a droplet discharge unit discharges droplets of a functional liquid material on a substrate as the droplet discharge unit is moved with respect to the substrate to form a liquid film on the substrate. The film formation method includes: discharging a plurality of first droplets onto a plurality of first positions on the substrate with the first positions being arranged so that the first droplets do not touch each other on the substrate; discharging a plurality of second droplets onto a plurality of second positions on the substrate with the second positions being disposed between the first droplets that were discharged on the substrate; and causing the second droplets to touch a plurality of adjacent ones of the first droplets to form the liquid film.

According to the film formation method of the first aspect of the present invention, second droplets are arranged between a plurality of adjacent first droplets, and the second droplets are allowed to tough the adjacent plurality of first droplets. Consequently, since the first droplets previously landed and arranged on the substrate are arranged so as not to touch each other, the first droplets do not coalesce with each other, contract to form streaks, or attract each other to form bulges. Furthermore, because the second droplets arranged between the first droplets substantially uniformly contact the first droplets on the periphery, there is no risk of any dots coalescing with only the first droplets on one side and contracting to form a streak, or being attracted together to form a bulge. Consequently, a liquid film having a uniform thickness can be satisfactorily formed on the substrate.

This film formation method is suitable when the first positions are provided at equal intervals, and the second positions are provided within a square-shaped area formed by four adjacent ones of the first positions.

According to this film formation method, the second positions are provided within the square-shaped area formed by the first positions. Consequently, the second positions are provided so that the gaps formed by the first droplets arranged in the first positions can be supplemented. As a result, the second droplets arranged in the second positions satisfactorily touch and coalesce with the adjacent first droplets, and a liquid film having a uniform film thickness can be formed on the substrate.

In this film formation method, a plurality of the second droplets may be arranged within a square-shaped area formed by four adjacent ones of the first positions.

According to this film formation method, a plurality of the second droplets is arranged within a square-shaped area formed by four adjacent first positions. Consequently, the liquid quantity of the second droplets may be increased, and the first droplets may easily be caused to come in contact with the second droplets. Since it is possible to reduce the number of times that the droplet discharge unit moves in relative fashion over the substrate, a film can be rapidly formed.

In this film formation method, a configuration may be adopted in which a discharge quantity is the same for a droplet that forms a first droplet, and for a droplet that forms a second droplet.

According to this film formation method, the droplets that form the first droplets and the second droplets have the same discharge quantity. The structure of the droplet discharge unit for forming the first droplets and the second droplets can therefore be simplified.

An orientation film formation method of the second aspect of the present invention is an orientation film formation method in which a droplet discharge unit discharges droplets of an orientation film formation material on a liquid crystal display device substrate as the droplet discharge unit is moved with respect to the liquid crystal display device substrate to form an orientation liquid film on the liquid crystal display device substrate. The orientation film formation method includes: discharging a plurality of first droplets onto a plurality of first positions on the liquid crystal display device substrate with the first positions being arranged so that the first droplets do not touch each other on the liquid crystal display device substrate; discharging a plurality of second droplets onto a plurality of second positions on the liquid crystal display device substrate with the second positions being disposed between the first droplets that were discharged on the liquid crystal display device substrate; and causing the second droplets to touch a plurality of adjacent ones of the first droplets to form the liquid film.

According to the orientation film formation method of the second aspect of the present invention, the first droplets do not coalesce with each other, contract to form streaks, or attract each other to form bulges. Furthermore, there is no risk of any second droplets coalescing with only the first droplets on one side and contracting to form a streak, or being attracted together to form a bulge. Consequently, an orientation film having a uniform thickness can be satisfactorily formed on the liquid crystal display device substrate.

A film formation method of the third aspect of the present invention is a film formation method for discharging droplets of a functional liquid material from a plurality of nozzles arranged so as to trace scanning trajectories at a prescribed pitch with respect to a substrate by scanning relative to the substrate to form a liquid film on the substrate. The film formation method includes: discharging a plurality of first droplets from the nozzles so that the droplets do not touch each other on the substrate; and discharging a plurality of second droplets from the nozzles to a plurality of second positions between the first droplets so that the second droplets touch the first droplets discharged on the substrate. The discharging of the first droplets includes discharging the first droplets at prescribed intervals in a scanning direction on the substrate. The discharging of the second droplets includes discharging the second droplets from the nozzles relating to adjacent ones of the scanning trajectories in different positions from each other with respect to the scanning direction.

According to the film formation method of the third aspect of the present invention, since the droplets discharged in the first discharge step are arranged so as not to touch each other, the droplets do not coalesce, contract to form streaks, or attract each other to form bulges. Furthermore, since the droplets discharged in the second discharge step are in contact with the droplets on the periphery, there is no risk of coalescence with any one droplet in particular. Consequently, a liquid film having a uniform thickness can be satisfactorily formed on the substrate.

In this film formation method, the second droplets discharged from nozzles relating to adjacent ones of the scanning trajectories are preferably arranged in positions that differ from each other by an amount commensurate with substantially half of the prescribed interval with respect to the scanning direction.

According to this film formation method, since the second droplets are substantially uniformly in contact with the droplets on the periphery, a liquid film having a uniform thickness can be more suitably formed on the substrate.

In this film formation method, the prescribed pitch and the prescribed interval may correspond to a distance that is in a range of one to two times a diameter of the droplets in the arranged state on the substrate.

According to this film formation method, since the prescribed pitch and interval are one to two times the droplets discharged in the first discharge step, the droplets discharged in the second discharge step can be suitably allowed to touch the adjacent droplets, and a liquid film having a uniform thickness can be formed on the substrate.

An orientation film formation method of the fourth aspect of the present invention is an orientation film formation method for discharging droplets of a functional liquid material from a plurality of nozzles arranged so as to trace scanning trajectories at a prescribed pitch with respect to a liquid crystal display device substrate by scanning relative to the liquid crystal display device substrate to form a liquid film on the liquid crystal display device substrate. The orientation film formation method includes: discharging a plurality of first droplets from the nozzles so that the droplets do not touch each other on the liquid crystal display device substrate; and discharging a plurality of second droplets from the nozzles to a plurality of second positions between the first droplets so that the second droplets touch the first droplets discharged on the liquid crystal display device substrate. The discharging of the first droplets includes discharging the first droplets at prescribed intervals in a scanning direction on the liquid crystal display device substrate. The discharging of the second droplets includes discharging the second droplets from the nozzles relating to adjacent ones of the scanning trajectories in different positions from each other with respect to the scanning direction.

According to the orientation film formation method of the fourth aspect of the present invention, since the droplets discharged in the first discharge step are arranged so as not to touch each other, the droplets do not coalesce, contract to form streaks, or attract each other to form bulges. Furthermore, since the droplets discharged in the second discharge step are in contact with the droplets on the periphery, there is no risk of coalescence with any one droplet in particular. Consequently, an orientation film having a uniform thickness can be satisfactorily formed on the liquid crystal display device substrate.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 5 is a side view showing the droplet discharge head;

FIG. 6 is a diagram showing the target positions;

FIG. 7 is a schematic diagram showing the blocks correlated on the surface of the substrate for pattern formation;

FIGS. 8A-8D are diagrams showing the droplets arranged on the opposing substrate in the first embodiment, wherein FIG. 8A is a diagram showing a state in which droplets of the first nozzle row are arranged in a positive movement scan; FIG. 8B is a diagram showing a state in which droplets of the second nozzle row are arranged in a positive movement scan; FIG. 8C is a diagram showing a state in which droplets of the second nozzle row are arranged in a negative movement scan; and FIG. 8D is a diagram showing a state in which droplets of the first nozzle row are arranged in a negative movement scan;

FIGS. 11A-11C are diagrams showing the droplets arranged on the opposing substrate in a second embodiment, wherein FIG. 11A is a diagram showing a state in which droplets of the first nozzle row are arranged; FIG. 11B is a diagram showing a state in which droplets of the second nozzle row are arranged; and FIG. 11C is a diagram showing a state in which droplets arranged by the second nozzle row are spread.

DETAILED DESCRIPTION OF EXEMPLARY EMBODIMENTS

First Embodiment

Figure 1:
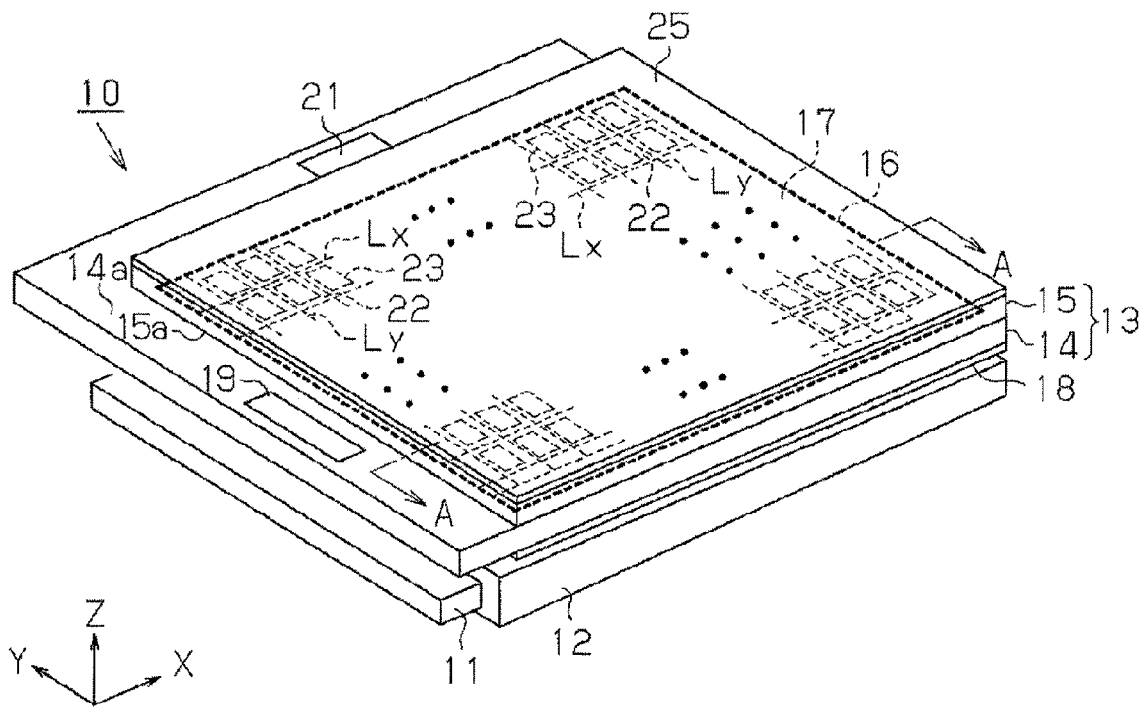
FIG. 1 is a perspective view showing the liquid crystal display device.
Figure 2:
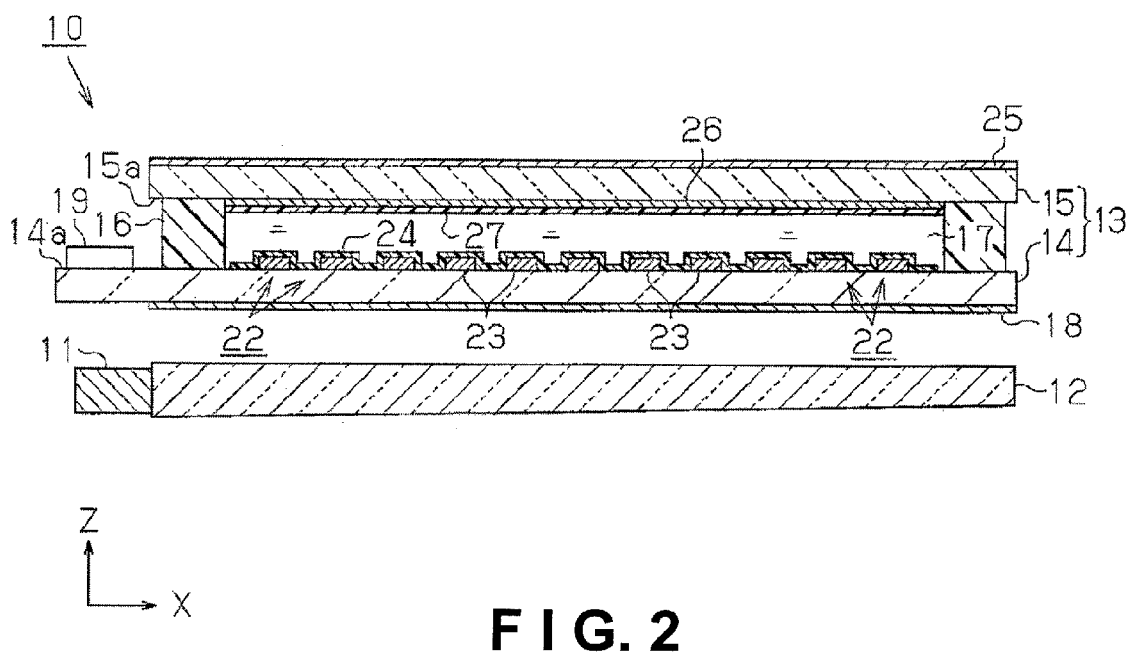
FIG. 2 is a sectional view showing the liquid crystal display device as viewed along line A-A in FIG. 1.

The first embodiment of the present invention will be described hereinafter according to FIGS. 1 through 10. A liquid crystal display device 10 having an orientation film formed by the film formation method of the present invention will first be described. FIG. 1 is a perspective view showing the liquid crystal display device 10, and FIG. 2 is a sectional view along line A-A in FIG. 1.

In FIG. 1, an edge-light-type backlight 12 formed in a square plate shape having an LED or other light source 11 is provided to the lower side of the liquid crystal display device 10. A square plate-shaped liquid crystal panel 13 formed substantially the same size as the backlight 12 is provided above the backlight 12. The light emitted from the light source 11 is emitted towards the liquid crystal panel 13.

An element substrate 14 as a liquid crystal display device substrate and an opposing substrate 15 as a liquid crystal display device substrate that face each other are provided to the liquid crystal panel 13. As shown in FIG. 2, the element substrate 14 and the opposing substrate 15 are affixed together via a square frame-shaped seal member 16 composed of a photo-curing resin. Liquid crystal 17 is sealed in the space between the element substrate 14 and the opposing substrate 15.

A polarizing plate, a phase difference plate, or other optical substrate 18 is affixed to the lower surface (surface on the side facing the backlight 12) of the element substrate 14. The optical substrate 18 linearly polarizes the light from the backlight 12 and emits the linearly polarized light to the liquid crystal 17. A plurality of scan lines Lx extending substantially along the entire width in one direction (direction indicated by the arrow X) is arranged and formed on the upper surface (surface on the side facing the opposing substrate 15: element formation surface 14a) of the element substrate 14. The scan lines Lx are each electrically connected to a scan line drive circuit 19 that is disposed on one side of the element substrate 14, and scan signals from the scan line drive circuit 19 are inputted at a prescribed timing. A plurality of data lines Ly extending along substantially the entire width in the direction indicated by the arrow Y is arranged and formed in the element formation surface 14a. The data lines Ly are each electrically connected to a data line drive circuit 21 disposed on the other side of the element substrate 14, and data signals based on display data from the data line drive circuit 21 are inputted at a prescribed timing. A plurality of pixels 22 arranged in a matrix is formed, and is connected to corresponding scan lines Lx and data lines Ly in the positions where the scan lines Lx and the data lines Ly intersect on the element formation surface 14a. A TFT or other control element not shown in the drawing, and a light-transmitting pixel electrode 23 composed of a transparent conductive film or the like are provided to each of the pixels 22.

In FIG. 2, an orientation film 24 in which a rubbing treatment or other orientation treatment is performed is layered on the entire upper side of each pixel 22. The orientation film 24 is in a thin-film pattern composed of an oriented polyimide or other oriented polymer, and is configured so as to set the orientation of the liquid crystal 17 to a prescribed orientation in the vicinity of the corresponding pixel electrode 23. The orientation film 24 is formed by an inkjet method. Specifically, the orientation film 24 is formed by a process in which an orientation film formation material F (see FIG. 5) as a functional liquid material in which an oriented polymer is dissolved in a prescribed solvent is discharged in the form of droplets Fb (see FIG. 5) on the entire upper side of each pixel 22, and the landed droplets Fb are dried.

A polarizing plate 25 for emitting linearly polarized light that is orthogonal to the light from the optical substrate 18 to the outside (upward in FIG. 2) is provided to the upper surface of the opposing substrate 15. An opposing electrode 26 composed of a light-transmitting conductive film formed so as to face the pixel electrodes 23 is layered on the lower surface (surface on the side facing the element substrate 14) of the opposing substrate 15. The opposing electrode 26 is electrically connected to the data line drive circuit 21, and a prescribed shared potential from the data line drive circuit 21 is applied to the opposing electrode 26. An orientation film 27 in which a rubbing treatment or other orientation treatment is performed is layered on the entire lower surface of the opposing electrode 26. The orientation film 27 is formed by an inkjet method, the same as the orientation film 24, and is configured so as to set the orientation of the liquid crystal 17 to a prescribed orientation in the vicinity of the opposing electrode 26.

The scan lines Lx are selected one at a time at a prescribed timing on the basis of line-sequential scanning, and set the control element of each pixel 22 to the ON state only during a selected period. A data signal based on display data from the corresponding data line Ly is then outputted to the pixel electrode 23 that corresponds to each control element. When data signals are outputted to the pixel electrodes 23, the orientation state of the corresponding liquid crystal 17 is modulated based on the potential difference between each pixel electrode 23 and the opposing electrode 26. Specifically, the polarization state of the light from the optical substrate 18 is modulated for each pixel 22. An image based on the display data is displayed on the upper side of the liquid crystal panel 13 according to whether the modulated light is transmitted through the polarizing plate 25.

The droplet discharge device 30 as the droplet discharge unit for forming the orientation film 27 (orientation film 24) will next be described according to FIGS. 3 through 5.

Figure 3:
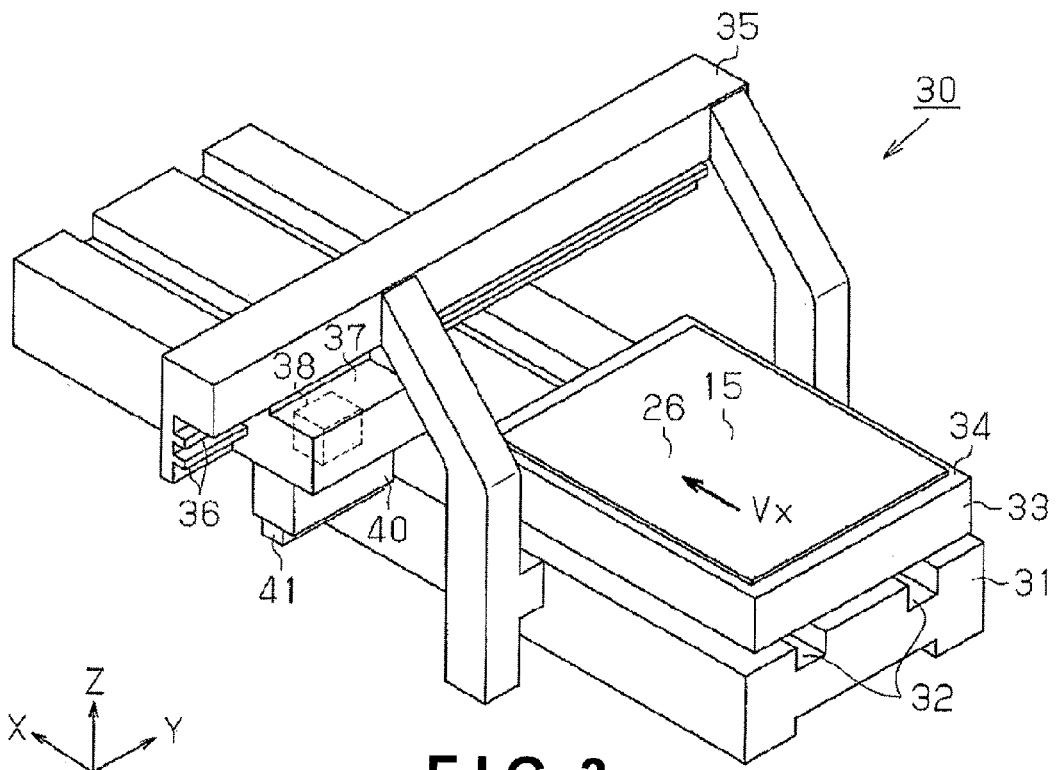
FIG. 3 is a perspective view showing the droplet discharge device.

In the droplet discharge device 30 shown in FIG. 3, a base 31 formed in a rectangular shape is provided, and a pair of guide grooves 32 extending along the longitudinal direction (X-arrow direction) is formed on the upper surface of the base 31. A substrate stage 33 as a movement unit that is drive-connected to the output shaft of an X-axis motor MX (shown on the upper left of FIG. 10) provided to the base 31 is provided above the base 31, and the substrate stage 33 is configured so as to move back and forth (scan in the X-arrow direction) in the X-arrow direction and the minus X-arrow direction at a prescribed speed (conveyance speed Vx) along the guide grooves 32.

A mounting surface 34 for enabling the opposing substrate 15 for which the opposing electrode 26 is facing upward to be mounted is formed on the upper surface of the substrate stage 33, and the mounting surface 34 fixes the mounted opposing substrate 15 in position in relation to the substrate stage 33. In the present embodiment, a configuration is adopted in which the opposing substrate 15 is mounted on the mounting surface 34 for the sake of convenience in the description, but a configuration may also be adopted in which a mother glass substrate is mounted in which a plurality of cells is partitioned and formed as opposing substrates 15 in which an opposing electrode 26 is formed. This configuration is not limiting, and a configuration may also be adopted in which an element substrate 14 in which the pixel electrodes 23 are facing upward is mounted, or in which a mother glass substrate is mounted in which a plurality of cells as element substrates 14 is partitioned and formed. Substrates of various sizes can also be fixed in position on the mounting surface 34.

A guide member 35 formed in a portal shape is provided on both sides of the base 31 in the Y-arrow direction, and a pair of upper and lower guide rails 36 extending in the Y-arrow direction is formed in the guide member 35. The guide member 35 is provided with a carriage 37 that is drive-connected to the output shaft of a Y-axis motor MY (shown on the lower left of FIG. 10) provided to the guide member 35, and the carriage 37 moves back and forth (is fed along the Y-arrow direction) in the Y-arrow direction and the minus Y-arrow direction along the guide rails 36. An ink tank 38 for accommodating the orientation film formation material F (see FIG. 5) is provided inside the carriage 37, and the orientation film formation material F accommodated by the ink tank 38 is conducted to a droplet discharge head 41 that is mounted below the carriage 37.

Figure 4:
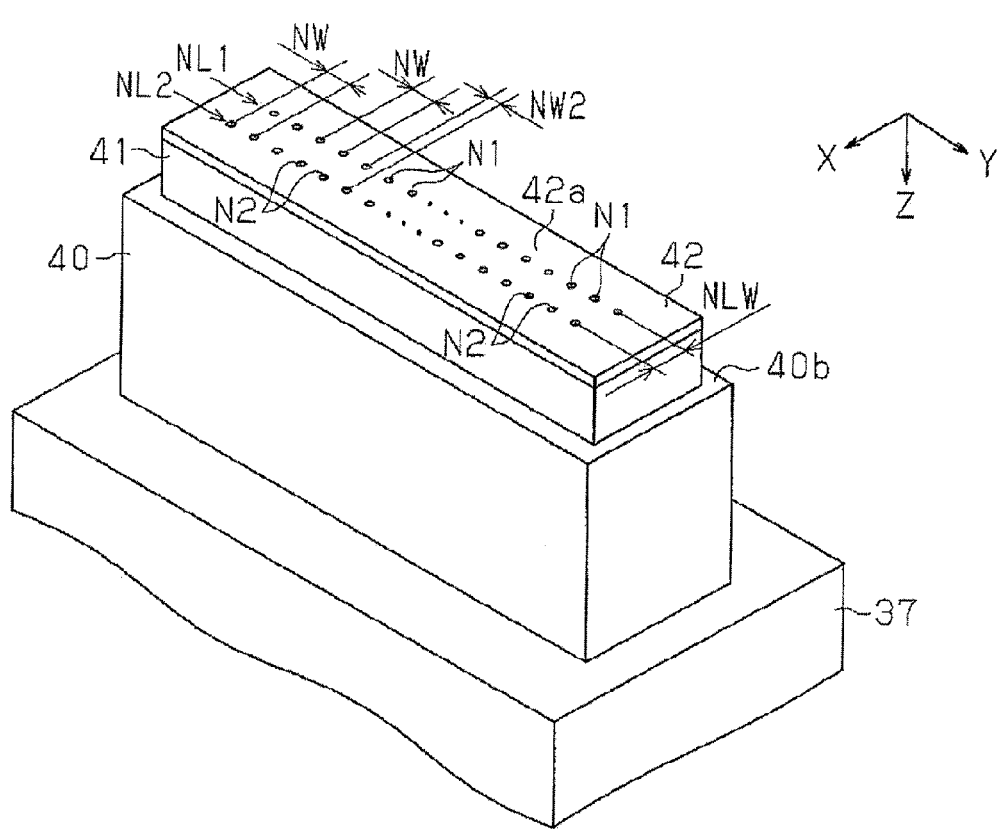
FIG. 4 is a perspective view showing the droplet discharge head.

FIG. 4 is a schematic perspective view showing the carriage 37 (droplet discharge head 41) as viewed from below (the opposing substrate 15 side), and FIG. 5 is a schematic side view showing the droplet discharge head 41 as viewed from the Y-arrow direction.

In FIG. 4, a rectangular-shaped housing 40 that extends in the Y-arrow direction is provided on the lower side (upper side in FIG. 4) of the carriage 37, and the droplet discharge head 41 (hereinafter referred to simply as the discharge head) formed in a rectangular shape extending in the Y-arrow direction is provided to an attachment surface 40b. A nozzle plate 42 is provided on the lower side (upper side in FIG. 4) of the droplet discharge head 41, and a nozzle formation surface 42a parallel to the attachment surface 40b is formed on the side of the nozzle plate 42 that faces the opposing substrate 15 (the upper side in FIG. 4).

In the nozzle formation surface 42a, two nozzle rows that include a first nozzle row NL1 and a second nozzle row NL2 extending in the Y-arrow direction are formed parallel to each other, and the second nozzle row NL2 is separated by an interval NLW in the X-arrow direction from the first nozzle row NL1. In the present embodiment, the value of the interval NLW is two millimeters, but the value of the interval NLW is not limited to this value.

In the first nozzle row NL1, a plurality (180) of nozzles N1 as discharge openings is arranged and formed at an equal pitch NW along the Y-arrow direction. A plurality (180) of nozzles N2 as discharge openings is also arranged and formed at an equal pitch NW along the Y-arrow direction in the second nozzle row NL2, in the same manner as in the first nozzle row NL1.

Furthermore, when the first nozzle row NL1 and the second nozzle row NL2 are viewed from the X-arrow direction, the nozzles N1 and the nozzles N2 are arranged in the nozzle formation surface 42a so as to be offset from each other at a pitch NW2 (hereinafter referred to as a half pitch) that is half the pitch NW in the Y-arrow direction. In the present embodiment, the pitch NW between the adjacent nozzles N1 of the first nozzle row NL1 as viewed from the X-arrow direction, and the pitch NW between the adjacent nozzles N2 of the second nozzle row NL2 are both 140 micrometers, and the half pitch NW2 between the nozzles N1 and the nozzle N2 adjacent thereto is 70 micrometers. Accordingly, when the first nozzle row NL1 and the second nozzle row NL2 are viewed from the X-arrow direction, the two sets of nozzles N1, N2 numbering 360 in total are arranged at the interval of the half pitch NW2, i.e., an interval of 70 micrometers.

In FIG. 5, the nozzles N1 of the first nozzle row (and the nozzles N2 of the second nozzle row NL2) are formed so as to lead through the nozzle plate 42 along the direction of the line normal to the nozzle formation surface 42a (attachment surface 40b), i.e., along the discharge direction A.

A cavity 43 communicated with the ink tank 38 is formed on the opposite side in the discharge direction A of each nozzle N1 (N2), and the orientation film formation material F from the ink tank 38 is fed to the corresponding nozzle N1 (N2). An oscillating plate 44 capable of oscillating in the discharge direction A and the opposite direction is affixed on the opposite side of the cavity 43 in the discharge direction A, and the oscillating plate 44 increases/decreases the volume inside the cavity 43. A plurality of piezoelectric elements PZ1 (PZ2) corresponding to the nozzles N1 (N2) is provided above the oscillating plate 44. The piezoelectric elements PZ1 (PZ2) contract/expand, and the corresponding oscillating plate 44 is oscillated in the discharge direction A and the opposite direction.

When the oscillating plate 44 oscillates, the volume of each cavity 43 increases/decreases, and the meniscus (interface of the orientation film formation material F) in each nozzle N1 (N2) oscillates. When the meniscus in each nozzle N1 (N2) oscillates, a prescribed weight of the orientation film formation material F is discharged from the corresponding nozzle N1 (N2) as a droplet Fb having a prescribed diameter, i.e., a prescribed liquid quantity. The discharged droplets Fb fly a flight distance L in the discharge direction A, and are landed and arranged on the opposing substrate 15 in which the opposing electrode 26 passing directly downward is formed.

In the present embodiment, the positions corresponding to the discharge direction A of the nozzles N1 of the first nozzle row NL1 are referred to as landing positions PF1. The positions corresponding to the discharge direction A of the nozzles N2 of the second nozzle row NL2 are referred to as landing positions PF2.

The discharge quantity of the droplets Fb discharged from the nozzles N1, N2 is controlled by a drive quantity of the piezoelectric elements PZ1, PZ2, and the drive quantity is controlled by piezoelectric element drive signals COM1, COM2 (see FIG. 10) described hereinafter that are outputted to the piezoelectric elements PZ1, PZ2.

The piezoelectric element drive signals COM1, COM2 of the present embodiment are generated based on waveform data WD1, WD2 (see FIG. 10) that are set on the basis of advance testing and the like, and are set so that the meniscus is smoothly oscillated, and the prescribed discharge quantity of the droplets Fb is discharged.

Furthermore, in the present embodiment, the discharge quantity of the droplets Fb discharged from the nozzles N1, N2 is set so as to be the same, and the diameter of the droplets Fb1 as the first droplets landed on the opposing substrate 15 is set to a prescribed diameter (landing diameter R1). The waveform data WD1, WD2 are set in the present embodiment so that the landing diameter R1 is 80 micrometers.

The droplet discharge device 30 forms a liquid film Z (see FIG. 9) as the orientation film 27 on the opposing substrate 15 by landing and arranging droplets Fb1 in which the landing diameter R1 is 80 micrometers on the opposing substrate 15.

The droplet arrangement method in which the droplet discharge device 30 is used to form the liquid film Z as the orientation film 27 on the opposing substrate 15 will be described according to FIGS. 6 through 9.

The opposing substrate 15 is moved back and forth once directly under the droplet discharge head 41, and droplets Fb are discharged during the positive movement (movement in the X-arrow direction) and the negative movement (movement in the minus X-arrow direction), after which the carriage 37 is fed to a new position, the opposing substrate 15 is again moved once back and forth, and droplets Fb are discharged in the same manner as before. The same operation is repeated thereafter, whereby the liquid film Z as the orientation film 27 is formed on the opposing substrate 15.

For convenience in the description, the discharge positions of droplets Fb on the opposing substrate 15 by the nozzles N1 of the first nozzle row NL1 are referred to as first nozzle row target discharge positions P1 as first positions and second positions. The discharge positions of droplets Fb on the opposing substrate 15 by the nozzles N2 of the second nozzle row NL2 are referred to as second nozzle row target discharge positions P2 as first positions and second positions.

FIG. 6 shows the first nozzle row target discharge positions P1 and the second nozzle row target discharge positions P2 during positive movement. As shown in FIG. 6, the first nozzle row target discharge positions P1 for the nozzles N1 of the first nozzle row NL1 are positions in which droplets Fb1 adjacent to each other that are landed and arranged in the X-arrow direction do not touch each other. In the same manner, the second nozzle row target discharge positions P2 for the nozzles N2 of the second nozzle row NL2 are positions in which droplets Fb1 adjacent to each other that are landed and arranged in the X-arrow direction do not touch each other.

The interval of the first nozzle row target discharge positions P1 adjacent to each other in the X-arrow direction is designated as the discharge interval W. In the same manner, the interval of the second nozzle row target discharge positions P2 adjacent to each other in the X-arrow direction is designated as the discharge interval W, which is the same as the interval of the adjacent first nozzle row target discharge positions P1.

As shown in FIG. 6, the second nozzle row target discharge positions P2 are offset by an interval W2 (=W/2) that is half the discharge interval W in the X-arrow direction with respect to the first nozzle row target discharge positions P1 adjacent to each other in the X-arrow direction.

Figure 8A:
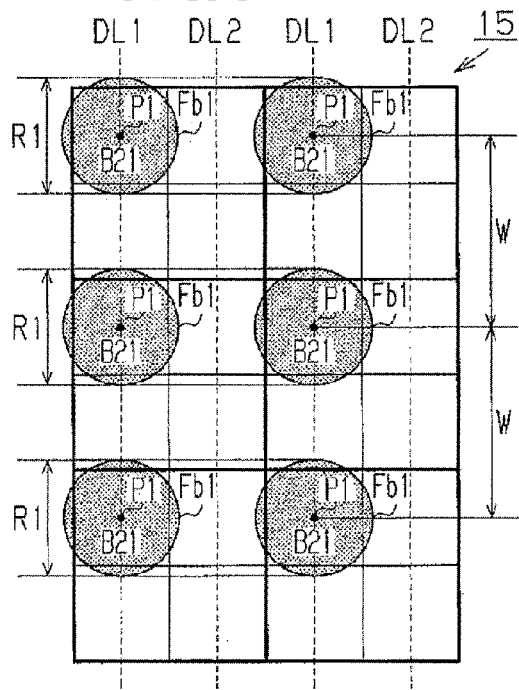
Figure 8B:
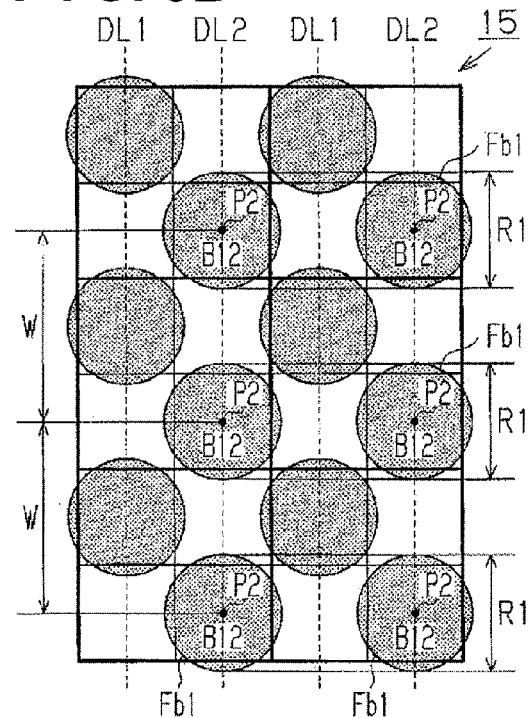

Consequently, when the opposing substrate 15 is moved positively, the droplet discharge head 41 is driven, and the droplets Fb are discharged (first pass), the droplets Fb1 arranged in the first nozzle row target discharge positions P1, and the droplets Fb1 arranged in the second nozzle row target discharge positions P2 are arranged in positions that are separated from each other, as shown in FIG. 8B. As a result, the droplets Fb1 arranged in the positions P1, P2 do not overlap each other, and there is no risk of the droplets Fb1 of one direction attracting the other droplets Fb1 and forming a single mass (first discharge step).

When positive movement occurs (X-arrow direction), and droplets Fb1 are landed and arranged in the first nozzle row target discharge positions P1 and the second nozzle row target discharge positions P2 shown in FIG. 6, the opposing substrate 15 is negatively moved, and droplets Fb1 are arranged in the newly set first nozzle row target discharge positions P1 and second nozzle row target discharge positions P2.

In this arrangement, the first nozzle row target discharge positions P1 during negative movement are positioned midway between the adjacent first nozzle row target discharge positions P1 set in the X-arrow direction during positive movement. In the same manner, the second nozzle row target discharge positions P2 during negative movement are positioned midway between the adjacent second nozzle row target discharge positions P2 set in the X-arrow direction during positive movement. Accordingly, the interval of the first nozzle row target discharge positions P1 adjacent in the X-arrow direction during negative movement is designated as the discharge interval W. In the same manner, the interval of the second nozzle row target discharge positions P2 adjacent in the X-arrow direction during negative movement is designated as the discharge interval W, which is the same as the interval of the adjacent first nozzle row target discharge positions P1 during negative movement.

Figure 8C:
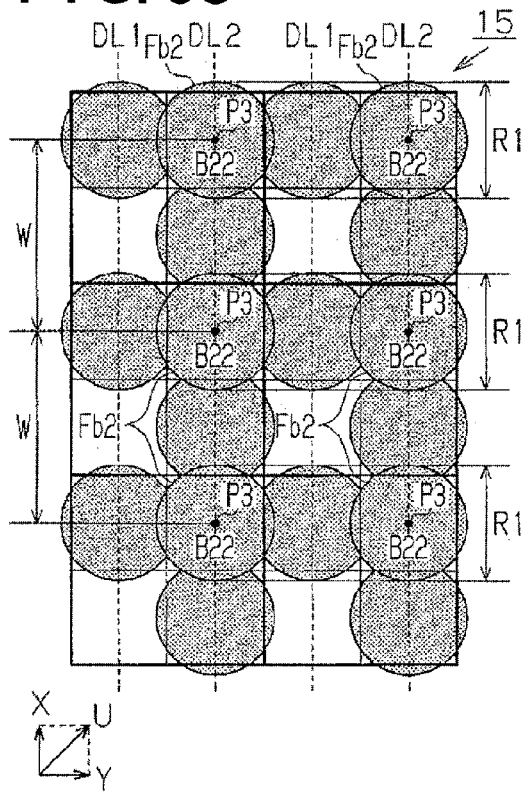
Figure 8D:
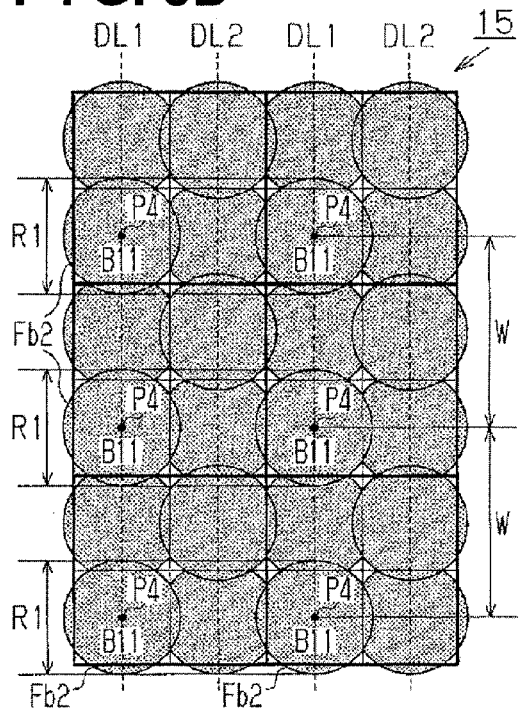

The opposing substrate 15 is moved negatively, the droplet discharge head 41 is driven, and droplets Fb are discharged (second pass). When the droplets Fb are discharged in the second pass, droplets Fb2 as second droplets arranged in the first nozzle row target discharge positions P1, and droplets Fb2 arranged in the second nozzle row target discharge positions P2 are arranged between the previously landed and arranged droplets Fb1, as shown in FIG. 8D (second discharge step).

Figure 9:
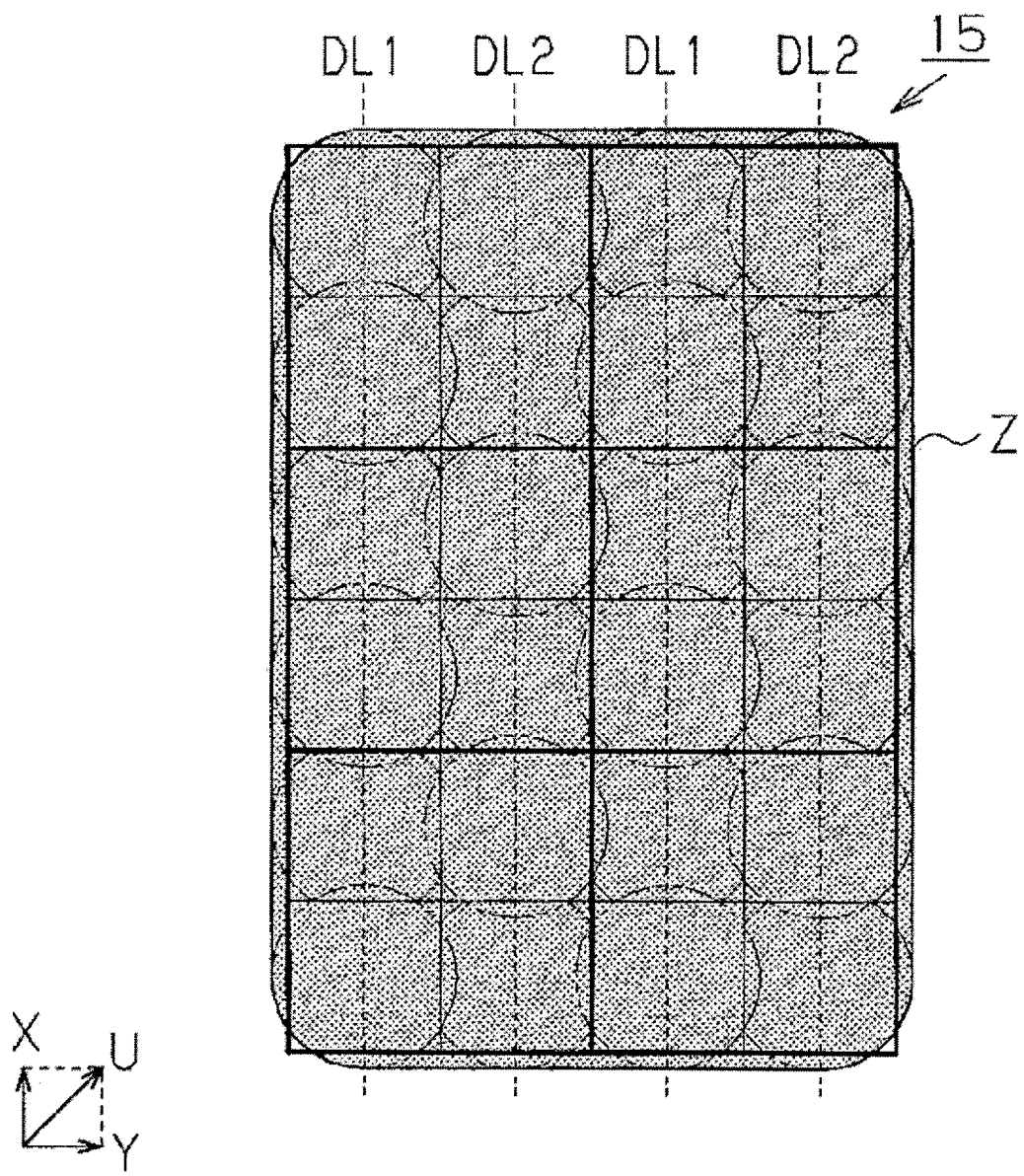
FIG. 9 is a schematic diagram showing the orientation film formation material arranged in the first embodiment.

Consequently, the droplets Fb2 arranged in the second pass coalesce with the adjacent four droplets Fb1 arranged in the first pass. At this time, since the droplets Fb2 arranged in the second pass coalesce with the adjacent four droplets Fb1, the droplets are not attracted in any one direction. As a result, the droplets coalesce in position with the previous droplets Fb1, and a flat liquid film Z is formed as shown in FIG. 9.

The electrical configuration of the droplet discharge device 30 configured as described above will next be described according to FIG. 10.

Figure 10:
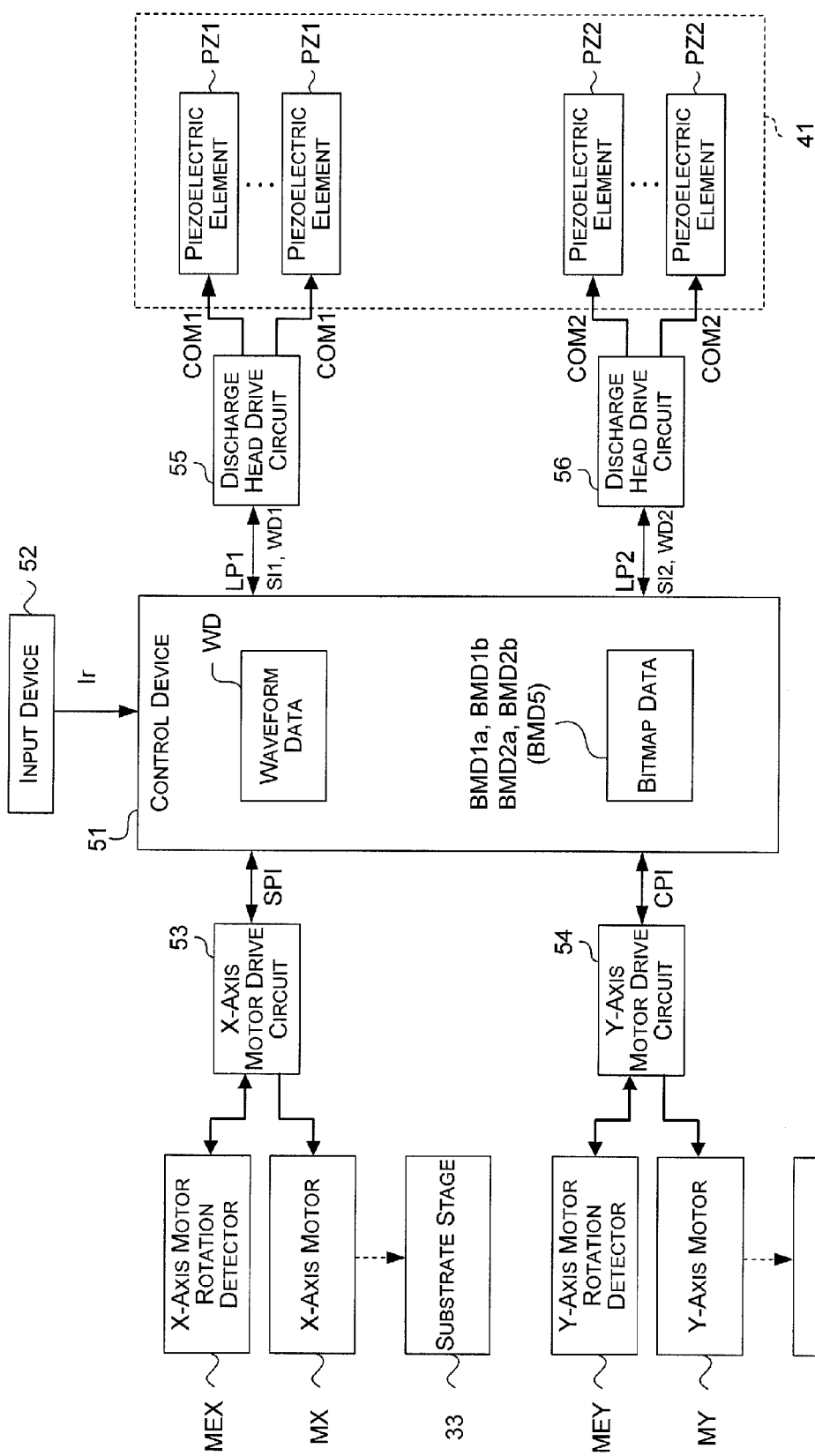
FIG. 10 is an electrical block diagram showing the electrical configuration of the droplet discharge device.

In FIG. 10, a control device 51 is provided with a CPU, RAM, ROM, and the like. The control device 51 causes the substrate stage 33 to scan, and the carriage 37 to be fed, and performs drive control of the piezoelectric elements PZ1, PZ2 of the droplet discharge head 41 in accordance with various types of data and various types of programs stored in the RAM, ROM, or the like.

An input device 52, an X-axis motor drive circuit 53, a Y-axis motor drive circuit 54, and first and second discharge head drive circuits 55, 56 are connected to the control device 51.

The input device 52 has a start switch, a stop switch, and other operating switches, and is configured so as to input various types of operating signals to the control device 51. The input device 52 is also configured so as to input information relating to the landing diameter R1 of the droplets Fb1 formed on the opposing substrate 15 as pre-formatted landing diameter information Ir to the control device 51. The landing diameter information Ir is inputted from the input device 52 to the control device 51.

The control device 51 then receives the landing diameter information Ir from the input device 52, and computes the first and second nozzle row target discharge positions P1, P2 of the droplets Fb discharged onto the opposing substrate 15 during the aforementioned positive movement (first pass) and negative movement (second pass). The control device 51 then generates bitmap data BMD1$a$, BMD1$b$ for the nozzles N1 of the first nozzle row NL1, and bitmap data BMD2$a$, BMD2$b$ for the nozzles N2 of the second nozzle row NL2 on the basis of the first and second nozzle row target discharge positions P1, P2.

The bitmap data BMD1$a$ are data in which bit values (0 or 1) are correlated to the first nozzle row target discharge positions P1 on the opposing substrate 15 during positive movement, and in which the piezoelectric elements PZ1 are set to ON or OFF according to the bit values. The bitmap data BMD1$a$ are defined so that a droplet Fb is discharged each time a corresponding first nozzle row target discharge position P1 passes directly under a nozzle N1.

The bitmap data BMD1$b$ are data in which bit values (0 or 1) are correlated to the first nozzle row target discharge positions P1 on the opposing substrate 15 during negative movement, and in which the piezoelectric elements PZ1 are set to ON or OFF according to the bit values. The bitmap data BMD1$b$ are defined so that a droplet Fb is discharged each time a corresponding first nozzle row target discharge position P1 passes directly under a nozzle N1.

The bitmap data BMD2$a$ are data in which bit values (0 or 1) are correlated to the second nozzle row target discharge positions P2 on the opposing substrate 15 during positive movement, and in which the piezoelectric elements PZ2 are set to ON or OFF according to the bit values. The bitmap data BMD2$a$ are defined so that a droplet Fb is discharged each time a corresponding second nozzle row target discharge position P2 passes directly under a nozzle N2.

The bitmap data BMD2$b$ are data in which bit values (0 or 1) are correlated to the second nozzle row target discharge positions P2 on the opposing substrate 15 during negative movement, and in which the piezoelectric elements PZ2 are set to ON or OFF according to the bit values. The bitmap data BMD2$b$ are defined so that a droplet Fb is discharged each time a corresponding second nozzle row target discharge position P2 passes directly under a nozzle N2.

The X-axis motor drive circuit 53 responds to drive control signals that correspond to the X-axis motor drive circuit 53 from the control device 51, and causes positive rotation or negative rotation of the X-axis motor MX for moving the substrate stage 33 back and forth. An X-axis motor rotation detector MEX is connected to the X-axis motor drive circuit 53, and a detection signal from the X-axis motor rotation detector MEX is inputted. The X-axis motor drive circuit 53 computes the movement direction and amount of movement of the substrate stage 33 (opposing substrate 15) on the basis of the detection signal from the X-axis motor rotation detector MEX, and generates information relating to the current position of the substrate stage 33 as stage position information SPI. The control device 51 receives the stage position information SPI from the X-axis motor drive circuit 53 and outputs various types of signals.

The Y-axis motor drive circuit 54 responds to drive control signals that correspond to the Y-axis motor drive circuit 54 from the control device 51, and causes positive rotation or negative rotation of the Y-axis motor MY for moving the carriage 37 back and forth. A Y-axis motor rotation detector MEY is connected to the Y-axis motor drive circuit 54, and a detection signal from the Y-axis motor rotation detector MEY is inputted. The Y-axis motor drive circuit 54 computes the movement direction and amount of movement of the carriage 37 on the basis of the detection signal from the Y-axis motor rotation detector MEY, and generates information relating to the current position of the carriage 37 as carriage position information CPI. The control device 51 receives the carriage position information CPI from the Y-axis motor drive circuit 54 and outputs various types of signals.

More specifically, the control device 51 generates discharge control signals SI1, SI2 before the opposing substrate 15 passes directly below the carriage 37. In other words, the control device 51 generates discharge control signals SI1, SI2 that are synchronized with a prescribed clock signal on the basis of the bitmap data BMD1$a$, BMD1$b$, BMD2$a$, BMD2$b$ that correspond to a scanned portion (positive movement or negative movement) of the opposing substrate 15, on the basis of the stage position information SPI and the carriage position information CPI. The control device 51 is configured so as to sequentially transfer the generated discharge control signals SI1, SI2 in serial fashion to the first and second discharge head drive circuits 55, 56 each time the substrate stage 33 scans in the X-arrow direction (positive movement) or the minus X-arrow direction (negative movement).

The control device 51 is also configured so as to generate a signal (discharge timing signal LP1) for outputting the piezoelectric element drive signal COM1 based on the waveform data WD1 to the piezoelectric elements PZ1 each time the landing positions PF1 of the nozzles N1 are positioned at the corresponding first nozzle row target discharge positions P1, on the basis of the stage position information SPI. The control device 51 then sequentially outputs the generated discharge timing signal LP1 to the first discharge head drive circuit 55.

The piezoelectric element drive signal COM1 is a signal for determining the discharge quantity of the droplets Fb that are discharged from the nozzles N1, and is generated based on the waveform data WD1. The waveform data WD1 are waveform data for determining the discharge quantities of the droplets Fb1, Fb2 with respect to the landing diameter R1 of the droplets Fb1 and the droplets Fb2 that are landed and arranged on the opposing substrate 15, and the waveform data WD1 are set based on prior experimentation and the like. In the present embodiment, the waveform data WD1 are waveform data for determining the discharge quantities of the droplets Fb1 and the droplets Fb2 so that the landing diameter R1 is 80 micrometers.

The first discharge head drive circuit 55 is connected to the piezoelectric elements PZ1 provided so as to correspond to the nozzles N1 of the first nozzle row NL1. The waveform data WD1, the discharge control signal SI1, and the discharge timing signal LP1 from the control device 51 are fed to the first discharge head drive circuit 55. The first discharge head drive circuit 55 receives the discharge control signal SI1 from the control device 51, correlates the discharge control signal SI1 with each of the piezoelectric elements PZ1, and performs sequential serial/parallel conversion.

The first discharge head drive circuit 55 feeds the piezoelectric element drive signal COM1 based on the waveform data WD1 to the piezoelectric elements PZ1 on the basis of the serial/parallel-converted discharge control signal SI1 each time the discharge timing signal LP1 from the control device 51 is received. Specifically, the first discharge head drive circuit 55 feeds the piezoelectric element drive signal COM1 to the piezoelectric elements PZ1 of the corresponding nozzles N1 each time the first nozzle row target discharge positions P1 pass directly under the nozzles N1 of the first nozzle row NL1.

In the same manner, the control device 51 is configured so as to generate a signal (discharge timing signal LP2) for outputting the piezoelectric element drive signal COM2 based on the waveform data WD2 to the piezoelectric elements PZ2 each time the landing positions PF2 of the nozzles N2 are positioned at the corresponding second nozzle row target discharge positions P2, on the basis of the stage position information SPI. The control device 51 then sequentially outputs the generated discharge timing signal LP2 to the second discharge head drive circuit 56.

The piezoelectric element drive signal COM2 is a signal for determining the discharge quantity of the droplets Fb that are discharged from the nozzles N2, and is generated based on the waveform data WD2. The waveform data WD2 are waveform data for determining the discharge quantities of the droplets Fb1, Fb2 with respect to the landing diameter R1 of the droplets Fb1 and the droplets Fb2 that are landed and arranged on the opposing substrate 15, and the waveform data WD2 are set based on prior experimentation and the like. In the present embodiment, the waveform data WD2 are waveform data for determining the discharge quantities of the droplets Fb1 and the droplets Fb2 so that the landing diameter R1 is 80 micrometers.

The second discharge head drive circuit 56 is connected to the piezoelectric elements PZ2 provided so as to correspond to the nozzles N2 of the second nozzle row NL2. The waveform data WD2, the discharge control signal SI2, and the discharge timing signal LP2 from the control device 51 are fed to the second discharge head drive circuit 56. The second discharge head drive circuit 56 feeds the piezoelectric element drive signal COM2 to the piezoelectric elements PZ2 of the corresponding nozzles N2 each time the second nozzle row target discharge positions P2 pass directly under the nozzles N2 of the second nozzle row NL2, according to the same method as the first discharge head drive circuit 55.

The method for forming the orientation film 27 on the opposing substrate 15 using the droplet discharge device 30 described above will next be described.

To facilitate the description, a plurality of imaginary blocks B is correlated in at least the range in which the pattern is formed on the upper surface of the opposing substrate 15, as shown in FIG. 7. The plurality of blocks B is arranged in an array determined by the X-arrow direction and the Y-arrow direction. The length of each of the plurality of blocks B in the X-arrow direction is 70 micrometers, and the length in the Y-arrow direction is 70 micrometers. The X-arrow direction and the Y-arrow direction are orthogonal to each other.

Each of the plurality of blocks B is a region in which a droplet Fb can be landed and arranged. In the present embodiment, when a droplet Fb is arranged in one certain block B, the droplet Fb is arranged so that the center of the arranged droplet Fb substantially coincides with the center of the block B. The pitch in the X-arrow direction of the plurality of blocks B corresponds to the half pitch NW2, which is the distance between the nozzles N1 and the nozzles N2 as viewed from the X-arrow direction. In the same manner, the pitch in the Y-arrow direction of the plurality of blocks B corresponds to the interval W2 that is half the distance of the discharge interval W.

In FIG. 7, 24 (=4×6) blocks B are shown for convenience of description, but the actual number of blocks B is not limited to 24.

In the present embodiment, a group of four blocks B made up of 2 blocks×2 blocks is defined as a block group BG. For convenience of description, each of the four blocks B is indicated by a reference number (e.g., B11) composed of the letter "B" and a two-digit suffix in order to distinguish each of the four blocks B in a single block group BG. The numerical value on the right side of the suffix indicates the position in the Y-arrow direction in the block group BG, and is the integer "1" or "2." The numerical value on the left side of the suffix indicates the position in the X-arrow direction in the block group BG, and is the integer "1" or "2."

In the case of blocks B11 of the block groups BG, for example, the blocks B11 are arranged in an array determined by the X-arrow direction and the Y-arrow direction on the surface of the opposing substrate 15. Specifically, the blocks B11 are periodically positioned in the X-arrow direction, in the Y-arrow direction, and in the synthesis direction U. In the present embodiment, the distance between the centers of two blocks B11 that are adjacent in the X-arrow direction is always 140 micrometers. The distance between the centers of two blocks B11 that are adjacent in the Y-arrow direction is also always 140 micrometers. Furthermore, in the direction U that is the synthesis of the X-arrow direction and the Y-arrow direction, the distance between the centers of adjacent blocks B11 is always 198.0 micrometers. The synthesis direction U of the X-arrow direction and the Y-arrow direction is the diagonal direction of the blocks B.

The opposing substrate 15 is first mounted on the substrate stage 33, as shown in FIG. 3. At this time, the substrate stage 33 is positioned further in the minus X-arrow direction than the carriage 37, and the carriage 37 is positioned furthest in the minus Y-arrow direction of the guide member 35.

In this state, the input device 52 is operated, and the landing diameter information Ir is inputted to the control device 51. The control device 51 then generates and stores bitmap data BMD1$a$, BMD2$a$ for the time of positive movement on the basis of the landing diameter information Ir.

When the bitmap data BMD1$a$, BMD2$a$ are generated, the control device 51 controls the driving of the Y-axis motor MY to position and move (feed) the carriage 37. The driving of the X-axis motor MX is then controlled, and the opposing substrate 15 is moved (scanned) only in the X-arrow direction. At this time, the pass trajectories on the opposing substrate 15 of the nozzles N1 when the opposing substrate 15 passes directly under the nozzles N1 are designated as scanning paths DL1 (see FIG. 6), which are scanning trajectories. The pass trajectories on the opposing substrate 15 of the nozzles N2 when the opposing substrate 15 passes directly under the nozzles N2 are designated as scanning paths DL2 (see FIG. 6), which are scanning trajectories.

When the opposing substrate 15 is transported (positively moved) in the X-arrow direction, the control device 51 causes droplets Fb to be discharged from the nozzles N1 when the corresponding first nozzle row target discharge positions P1 pass directly under the nozzles N1 in the scanning paths DL1. The control device 51 then causes droplets Fb to be discharged from the nozzles N2 when the corresponding second nozzle row target discharge positions P2 pass directly under the nozzles N2 in the scanning paths DL2.

FIG. 8A shows a state in which droplets Fb are arranged in the first nozzle row target discharge positions P1. FIG. 8B shows a state in which droplets Fb are arranged in the second nozzle row target discharge positions P2.

The first nozzle row NL1 and the second nozzle row NL2 are at a distance equal to the interval NLW (2 millimeters) from each other in the X-arrow direction. Consequently, after droplets Fb are supplied to the target discharge positions P1 (blocks B21), the nozzles N2 pass directly over the target discharge positions P2 (blocks B12) in the same block group BG after the substrate stage 33 moves (scans) a distance equal to interval NLW+interval W2 (=2 millimeters+70 micrometers) in the X-arrow direction from the target discharge positions P1.

At this time, as viewed from the X-arrow direction, the nozzles N1 and the adjacent nozzles N2 are at the half pitch NW2 (70 micrometers) away from each other (see FIG. 4), and the first nozzle row target discharge positions P1 and the adjacent second nozzle row target discharge positions P2 are also at the half pitch NW2 (70 micrometers) away from each other (see FIG. 6).

As a result, in the present embodiment, since the distance between the first nozzle row target discharge positions P1 and the second nozzle row target discharge positions P2 in the same block group BG is approximately 99 micrometers, the droplets Fb1 having a landing diameter R1 of 80 micrometers formed in the target discharge positions P1, P2 are arranged in positions in which the droplets Fb1 do not touch each other.

When landing and arrangement of the droplets Fb1 by positive movement is completed, the control device 51 temporarily stops the substrate stage 33 (opposing substrate 15).

The control device 51 then generates the bitmap data BMD1*b*, BMD2*b* for negative movement of the opposing substrate 15 (substrate stage 33).

When the bitmap data BMD1*b*, BMD2*b* are generated, the control device 51 controls the driving of the Y-axis motor MY so that the opposing substrate 15 is moved only in the minus X-arrow direction.

When the opposing substrate 15 is transported (negatively moved) in the minus X-arrow direction, the control device 51 causes droplets Fb to be discharged from the nozzles N1 when the corresponding first nozzle row target discharge positions P1 pass directly under the nozzles N1 in the scanning paths DL1. The control device 51 then causes droplets Fb to be discharged from the nozzles N2 when the corresponding second nozzle row target discharge positions P2 pass directly under the nozzles N2 in the scanning paths DL2. FIG. 8C shows a state in which droplets Fb are arranged in the second nozzle row target discharge positions P2. FIG. 8B shows a state in which droplets Fb are arranged in the first nozzle row target discharge positions P1.

The second nozzle row target discharge positions P2 (indicated by P3 in FIG. 8C), i.e., the droplets Fb2 formed by the droplets Fb landed in the blocks B22, make contact in four directions, i.e., with the droplets Fb1 arranged in blocks B12 and B21.

When the droplets Fb2 of the blocks B22 are in contact only with the droplets Fb1 of one direction, for example, the droplets Fb2 sometimes coalesce with the contacting droplets Fb1, and the center positions thereof move. However, since contact is made in four directions at substantially the same time, the droplets Fb2 coalesce with the contacting droplets Fb1 with good balance, and a liquid surface can be satisfactorily formed. The droplets Fb2 arranged in target discharge positions P3 (blocks B22) as second positions at the corners or edges only make contact with the droplets Fb1 arranged in the blocks B12 or blocks B21 in two directions or three directions, but because contact is always made with the droplets Fb1 in the range in which the orientation film 27 must be formed, the liquid surface can be satisfactorily formed.

The first nozzle row NL1 and the second nozzle row NL2 are at a distance equal to the interval NLW (2 millimeters) from each other in the X-arrow direction. Therefore, after the nozzles N2 discharge droplets Fb in the target discharge position P3 in a single block group BG, the nozzles N1 begin discharging droplets Fb in the first nozzle row target discharge positions P1 (indicated by P4 in FIG. 8D) in the same block group BG when the opposing substrate 15 is moved 2 millimeters–70 micrometers in the minus X-arrow direction.

Consequently, the droplets Fb discharged from the nozzles N1 are sequentially landed in the target discharge positions P4 (blocks B11) as second positions that are separated at the discharge interval W in the X-arrow direction, as shown in FIG. 8D.

When droplets Fb2 having the landing diameter R1 (=80 micrometers) are formed on the upper surface of the opposing substrate 15, the droplets Fb landed in the target discharge positions P4 (blocks B11) make contact at substantially the same time in four directions, i.e., with the droplets Fb1 arranged in the blocks B12 and the blocks B21. When the droplets Fb1 of the blocks B11 are in contact only with the droplets Fb1 of one direction, for example, the contacting droplets Fb1 coalesce, and the center positions move. However, since contact is made in four directions at substantially the same time, the droplets Fb2 coalesce with the contacting droplets Fb1 with good balance, and a liquid surface can be satisfactorily formed.

The droplets Fb2 arranged in target discharge positions P4 (blocks B11) at the corners or edges only make contact with the droplets Fb1 arranged in the blocks B12 or blocks B21 in two directions or three directions, but because contact is always made with the droplets Fb1 in the range in which the orientation film 27 must be formed, the liquid surface can be satisfactorily formed.

When landing and arrangement of the droplets Fb2 by negative movement is completed, the control device 51 temporarily stops the substrate stage 33 (opposing substrate 15). The control device 51 then causes the carriage 37 to feed to a new position. After the carriage 37 is fed, the control device 51 generates the bitmap data BMD1*a*, BMD2*a* for positive movement, and the bitmap data BMD1*b*, BMD2*b* for negative movement at the respective times, and repeats the arrangement of droplets Fb1 and droplets Fb2 in the opposing substrate 15. A flat liquid film Z is formed on the opposing substrate 15 as shown in FIG. 9.

When formation of the liquid film Z composed of the orientation film formation material F on the upper surface of the opposing electrode 26 of the opposing substrate 15 is completed, the solvent included in the orientation film formation material F is dried by baking or the like, and the orientation film 27 is formed.

Such effects as the following can be obtained through the present embodiment.

(1) According to the present embodiment, the discharge interval W is larger than the landing diameter R1. Consequently, the droplets Fb1 landed in the target discharge positions P1, P2 can be arranged without touching each other. As a result, the droplets Fb1 arranged in the target discharge positions P1, P2 do not coalesce with each other, contract to form streaks, or attract each other to form bulges. Since the target discharge positions P3, P4 are merely offset from the target discharge positions P1, P2 by the interval W2 in the X-arrow direction, and by the half pitch NW2 in the Y-arrow direction, the droplets Fb2 arranged in the target discharge positions P3, P4 substantially uniformly contact the droplets Fb1 on the periphery. As a result, there is no risk of the droplets Fb2 coalescing with only the droplets Fb1 on one side and contracting to form a line, or being attracted together to form a bulge. A film having a uniform thickness can thereby be satisfactorily formed on the substrate.

(2) According to the present embodiment, the droplets Fb1 are formed from droplets Fb that are sequentially discharged and arranged from the nozzles N1, and droplets Fb that are sequentially discharged and arranged from the nozzles N2. Consequently, droplets Fb1 that do not touch each other can easily be formed by the droplet discharge device 30. The droplets Fb2 are also formed from droplets Fb that are sequentially discharged and arranged from the nozzles N2, and droplets Fb that are sequentially discharged and arranged from the nozzles N1. Consequently, droplets Fb2 that touch the droplets Fb1 can easily be formed by the droplet discharge device 30. As a result, an orientation film 27 having a more uniform thickness can easily be formed on the substrate.

(3) According to the present embodiment, the target discharge positions P3, P4 are set in the center of a square-shaped area formed by two first nozzle row target discharge positions P1 and two second nozzle row target discharge positions P2. Consequently, the droplets Fb2 can be caused to make contact with the droplets Fb1 on the substrate as uniformly as possible. As a result, an orientation film 27 having a more uniform thickness can easily be formed on the substrate.

(4) According to the present embodiment, the space of the pitch NW of the droplets Fb1 of the target discharge positions P1 is supplemented by the droplets Fb1 of the target discharge positions P2. Consequently, droplets Fb1 that do not coalesce with each other can be more finely discharged on the substrate. Furthermore, the space of the pitch NW of the droplets Fb2 of the target discharge positions P3 is supplemented by the droplets Fb2 of the target discharge positions P4. Consequently, the droplets Fb1 and the droplets Fb2 can be more finely brought into contact with each other on the substrate. As a result, a orientation film 27 having a more uniform thickness can be formed on the substrate.

(5) According to the present embodiment, the droplets Fb have the same discharge quantity. Consequently, the structure of the droplet discharge head 41 for discharging the droplets Fb from the nozzles N1, N2 can be simplified, and the control for discharging the droplets from the nozzles N1, N2 can also be performed more easily.

(6) According to the present embodiment, droplets Fb composed of an orientation film formation material F are discharged. Consequently, a orientation film 27 having a uniform thickness can be satisfactorily formed on the opposing substrate 15.

(7) According to the present embodiment, an orientation film 27 is formed on the opposing substrate 15 of a liquid crystal display device 10. The liquid crystal display device 10 can therefore be satisfactorily formed.

Second Embodiment

The second embodiment of the present invention will be described hereinafter according to FIG. 11.

In the first embodiment, droplets Fb are discharged on the opposing substrate 15 in a positive movement and a negative movement, i.e., in two passes, and the liquid film Z as the orientation film 27 is formed. However, the second embodiment differs in that the liquid film Z as the orientation film 27 is formed in a positive movement or a negative movement, i.e., in a single pass. Accordingly, the interval of the second nozzle row target discharge positions P2 also differs from the first embodiment.

Figure 11A:
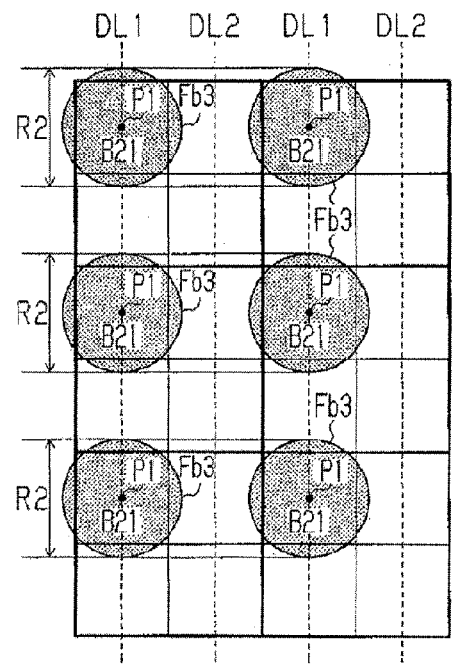
Figure 11B:
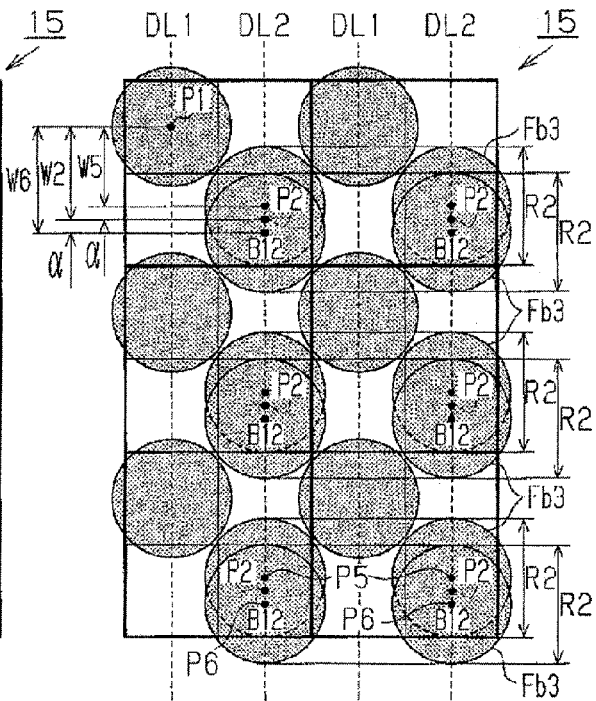

In other words, the first nozzle row NL1 and the second nozzle row NL2 are at a distance equal to the interval NLW (2 millimeters) from each other in the X-arrow direction. Therefore, the nozzles that are first to discharge droplets Fb, e.g., the nozzles N1 of the first nozzle row NL1 when the opposing substrate 15 moves positively, land and arrange droplets Fb1 first in the first nozzle row target discharge positions P1 as shown in FIG. 11A, in the same manner as in the first embodiment. Two second nozzle row target discharge positions P2 for the nozzles N2 of the subsequent second nozzle row NL2 are then set between first nozzle row target discharge positions P1 that are adjacent in the X-arrow direction as shown in FIG. 11B. Specifically, the two second nozzle row target discharge positions P2 in the second embodiment are discharge positions P5, P6 as second positions that are biased a distance α in the X-arrow direction and the minus X-arrow direction with the second nozzle row target discharge positions P2 of the first embodiment at the center. In the present embodiment, the distance α is set to 5 micrometers.

In the second embodiment, the discharge quantity of the droplets Fb is set so that the landing diameter R2 of the droplets Fb3 as first droplets arranged in the first nozzle row target discharge positions P1 and the second nozzle row target discharge positions P2 is 90 micrometers. Consequently, the distance between the discharge positions P5 and the closest first nozzle row target discharge positions P1 to the discharge positions P5 is 95.5 micrometers, and the droplets Fb3 do not touch each other when the droplets Fb3 having the landing diameter R2 (90 micrometers) are arranged in the discharge positions P5 and the target discharge positions P1. In the same manner, the distance between the discharge positions P6 and the closest first nozzle row target discharge positions P1 to the discharge positions P6 is 95.5 micrometers, and the droplets Fb3 do not touch each other when the droplets Fb3 having the landing diameter R2 (90 micrometers) are arranged in the discharge positions P6 and the target discharge positions P1.

When the positional coordinates of the discharge positions P5 and the discharge positions P6 are computed, the control device 51 generates and stores bitmap data BMD5 for discharging droplets Fb from the nozzle row NL2.

The bitmap data BMD5 are data in which bit values (0 or 1) are correlated to the discharge positions P5 and the discharge positions P6 on the opposing substrate 15, and in which the piezoelectric elements PZ2 are set to ON or OFF according to the bit values. In other words, the discharge positions P5 and the discharge positions P6 are synthesized in the generated bitmap BMD5. The bitmap data BMD5 are defined so that a droplet Fb is discharged each time a corresponding discharge position P5 or discharge position P6 passes directly under a nozzle N2.

In other words, in the present embodiment, droplets Fb are discharged from the nozzles N1 on the basis of the bitmap data BMD1a, and droplets Fb are discharged from the nozzles N2 on the basis of the bitmap data BMD5.

The method for forming the orientation film 27 using the droplet discharge device 30 described above will next be described.

The opposing substrate 15 is first mounted on the substrate stage 33, as shown in FIG. 3.

In this state, the input device 52 is operated, and the landing diameter information Ir is inputted to the control device 51. The control device 51 then generates and stores bitmap data BMD1a, BMD5 that are based on the landing diameter information Ir, and positions and moves the carriage 37. When the scanning paths DL1 of the nozzles N1 are set over the corresponding first nozzle row target discharge positions P1, and the scanning paths DL2 of the nozzles N2 are set over the corresponding discharge positions P5, P6, the control device 51 initiates transport (scanning) of the substrate stage 33 (opposing substrate 15) in the X-arrow direction.

When the opposing substrate 15 is scanned in the X-arrow direction with respect to the droplet discharge head 41, the first nozzle row target discharge positions P1 pass directly under the nozzles N1 of the first nozzle row NL1. Each time the first nozzle row target discharge positions P1 pass directly under the nozzles N1 of the first nozzle row NL1, the droplets Fb discharged from the nozzles N1 are sequentially landed and arranged in the first nozzle row target discharge positions P1 (blocks B21) separated by the discharge interval W (=140 micrometers) in the X-arrow direction, as shown in FIG. 11A (first discharge step).

The first nozzle row NL1 and the second nozzle row NL2 are separated from each other by the interval NLW (2 millimeters) in the X-arrow direction. Consequently, after the nozzles N1 discharge droplets Fb in the first nozzle row target discharge positions P1 in one block group BG, the opposing substrate 15 scans a prescribed interval in the X-arrow direction, and when the discharge positions P5 and the discharge positions P6 in the same block group BG pass directly under the second nozzle row NL2, droplets Fb are discharged from the nozzles N2, as shown in FIG. 11B (second discharge step).

The interval W5 in the X-arrow direction from the first nozzle row target discharge positions P1 to the discharge positions P5 (second nozzle row target discharge positions P2) in the same block B is the length (=65 micrometers) obtained by subtracting the distance α (=5 micrometers) from the interval W2. The interval W6 in the X-arrow direction from the first nozzle row target discharge positions P1 to the discharge positions P6 (second nozzle row target discharge positions P2) in the same block B is the length (=75 micrometers) obtained by adding the distance α to the interval W2.

In other words, droplets Fb are first supplied to the first nozzle row target discharge positions P1 (blocks B21). Droplets Fb from the nozzles N2 are then arranged in the discharge positions P5 (in the blocks B12) in the same block group BG after the substrate stage 33 moves (scans) a distance equal to the interval NLW+the interval W5 (=2 millimeters+65 micrometers) in the X-arrow direction from the first nozzle row target discharge positions P1. In the same manner, droplets Fb from the nozzles N2 are then arranged in the discharge positions P6 (in the blocks B12) in the same block group BG after the substrate stage 33 moves (scans) a distance equal to the interval NLW+the interval W6 (=2 millimeters+75 micrometers) in the X-arrow direction from the first nozzle row target discharge positions P1.

Specifically, the control device 51 feeds the piezoelectric element drive signal COM2 that corresponds to the waveform data WD2 to the piezoelectric elements PZ2 at the timing at which the discharge positions P5 or the discharge positions P6 pass directly under the nozzles N2.

The droplets Fb3 are landed and arranged in the discharge positions P5, and when the droplets Fb3 are then landed and arranged in the discharge positions P6, the droplets Fb3 touch and coalesce with the droplets Fb3 that were already arranged in the discharge positions P5.

The coalesced droplets Fb3 in the discharge positions P5 and droplets Fb3 in the discharge positions P6 form droplets Fb4 as single second droplets. The center positions of both droplets Fb3 in both discharge positions P5, P6 become the second nozzle row target discharge positions P2 of the first embodiment, and the droplets Fb4 are therefore formed with the second nozzle row target discharge positions P2 (blocks B12) of the first embodiment at the center thereof. The diameter of the droplets Fb4 immediately after coalescing is approximately the value obtained by adding a length of 2α (=10 micrometers) to the landing diameter R2 (=90 micrometers), but because the weight (liquid quantity) of the droplets Fb4 is unstable at this diameter, the diameter of the droplets Fb4 increases significantly.

Figure 11C:
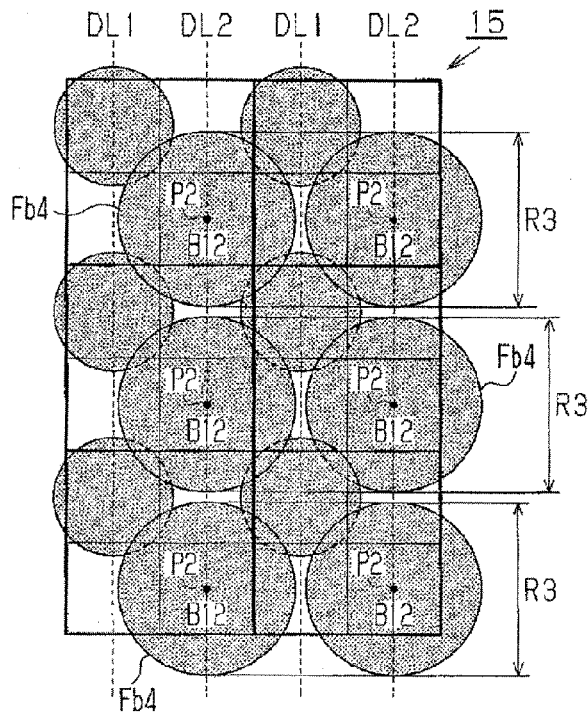

The spread droplets Fb4 eventually touch in four directions, i.e., the droplets Fb3 arranged in the blocks B21, at substantially the same time, as shown in FIG. 11C. When the droplets Fb4 of the blocks B12 are in contact only with the droplets Fb3 of one direction, for example, the droplets Fb4 sometimes coalesce with the contacting droplets Fb3, and the center positions thereof move. However, since contact is made in four directions at substantially the same time, the droplets Fb4 coalesce with the contacting droplets Fb3 with good balance, and a liquid surface can be satisfactorily formed. The droplets Fb4 arranged in the blocks B12 at the corners or edges only make contact with the droplets Fb3 arranged in the blocks B21 in two directions or three directions, but because contact is always made with the droplets Fb3 in the range in which the orientation film 27 must be formed, the liquid surface can be satisfactorily formed.

When landing and arrangement of the droplets Fb in the target discharge positions P1 and the discharge positions P5, P6 by positive movement is completed, the control device 51 performs control to stop the X-axis motor MX and stop transporting of the substrate stage 33 (opposing substrate 15) in the X-arrow direction.

The control device 51 then moves (feeds) the carriage 37 in the Y-arrow direction and repeats landing and arrangement of droplets Fb on the opposing substrate 15 by the same method.

When formation of the liquid film Z composed of the orientation film formation material F on the upper surface of the opposing substrate 15 is completed, the solvent included in the orientation film formation material F is dried by baking or the like, and the orientation film 27 is formed.

Such effects as the following can be obtained through the present embodiment in addition to the effects of the first embodiment.

(1) According to the present embodiment, two droplets Fb3 are arranged from the nozzles N2 in the same block B12, the two droplets Fb3 are caused to touch each other and coalesce to form a droplet Fb4, and the droplet Fb4 is brought into contact with the droplets Fb3 formed by the nozzles N1. Consequently, the droplets Fb3 and the droplets Fb4 are coalesced with each other to form the liquid film Z on the opposing substrate 15 by a single scan of the droplet discharge head 41. As a result, the liquid film Z composed of the orientation film formation material F can be more quickly formed on the opposing substrate 15, and the orientation film 27 can be formed.

The embodiments described above may be modified as described below.

In the embodiments described above, the orientation film 27 was formed on the opposing substrate 15 by the droplet discharge device 30. However, this configuration is not limiting, and the orientation film 27 may be formed on the element substrate 14 or a film or layer other than the opposing substrate 15, and a resist or the like may also be formed in a film formation step.

In the embodiments described above, the orientation film 27 was formed on the opposing substrate 15 of a liquid crystal display device 10. However, this configuration is not limiting, and the substrate may be any type of substrate. For example, the substrate may be a substrate of an organic electroluminescence device, an electrophoresis display device, or the like as an electro-optical device other than a liquid crystal display device.

In the embodiments described above, the droplet discharge head 41 was provided with two nozzle rows NL1, NL2 that were parallel in the X-arrow direction. However, this configuration is not limiting, and a single nozzle row may be provided.

In this case, in the first embodiment, the substrate stage 33 is scanned in the X-arrow direction, droplets Fb are discharged in all of the target discharge positions P1, and the carriage 37 is fed a distance equal to the interval W2 in the Y-arrow direction, after which the substrate stage 33 is scanned in the minus X-arrow direction, and droplets Fb are discharged in the target discharge positions P2. The substrate stage 33 is then scanned in the X-arrow direction, droplets Fb are discharged in all of the target discharge positions P3, and the carriage 37 is fed a distance equal to the interval W2 in the minus Y-arrow direction, after which the substrate stage 33 may be scanned in the minus X-arrow direction, and droplets Fb may be discharged in the target discharge positions P4.

In the second embodiment, a configuration may be adopted in which the substrate stage 33 is scanned in the X-arrow direction, droplets Fb are discharged in all of the target discharge positions P1, and the carriage 37 is fed a distance equal to the interval W2 in the Y-arrow direction, after which the substrate stage 33 is scanned in the minus X-arrow direction, and droplets Fb are discharged in the discharge positions P5, P6.

In the embodiments described above, the droplet discharge head 41 was provided with two nozzle rows NL1, NL2 that were parallel in the X-arrow direction. However, this configuration is not limiting, and more than two nozzle rows may be provided.

In the embodiments described above, the discharging of the nozzle rows NL1, NL2 was controlled by discharge head drive circuits 55, 56, respectively. However, this configuration is not limiting, and both sets of nozzles N1, N2 may be controlled by the same discharge head drive circuit, or discharging may be controlled by a larger number of discharge head drive circuits.

In the embodiments described above, the target discharge positions P1 and the target discharge positions P2 were offset by an interval W2 equal to half the discharge interval W in the X-arrow direction. However, this configuration is not limiting, and the offset interval may be smaller than the interval W2 in the X-arrow direction. In other words, an interval may be adopted in the first embodiment whereby subsequently arranged droplets Fb2 are appropriately brought into contact with the previously arranged droplets Fb1, and an interval may be adopted in the same manner in the second embodiment whereby subsequently arranged droplets Fb4 are appropriately brought into contact with the previously arranged droplets Fb3.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A film formation method in which a droplet discharge unit discharges droplets of a functional liquid material on a substrate as the droplet discharge unit is moved with respect to the substrate to form a liquid film on the substrate, the film formation method comprising:
    discharging a plurality of first droplets onto a plurality of first positions on the substrate with the first positions being arranged so that the first droplets do not touch each other on the substrate; and
    discharging a plurality of second droplets onto a plurality of second positions on the substrate before the first droplets are dried, with the second positions being disposed between the first droplets that were discharged on the substrate so that the second droplets coalesce with a plurality of adjacent ones of the first droplets to form the liquid film.

2. The film formation method according to claim 1, wherein
    the discharging of the first droplets includes discharging the first droplets onto the first positions that are provided at equal intervals on the substrate, and
    the discharging of the second droplets includes discharging the second droplets onto the second positions that are provided within a square-shaped area formed by four adjacent ones of the first positions.

3. The film formation method according to claim 2, wherein
    the discharging of the second droplets includes discharging the second droplets onto the second positions so that a plurality of the second droplets is arranged within the square-shaped area formed by the four adjacent ones of the first positions.

4. The film formation method according to claim 1, wherein
    a discharge quantity is the same for a droplet that forms a first droplet, and for a droplet that forms a second droplet.

5. An orientation film formation method in which a droplet discharge unit discharges droplets of an orientation film formation material on a liquid crystal display device substrate as the droplet discharge unit is moved with respect to the liquid crystal display device substrate to form an orientation liquid film on the liquid crystal display device substrate, the orientation film formation method comprising:

discharging a plurality of first droplets onto a plurality of first positions on the liquid crystal display device substrate with the first positions being arranged so that the first droplets do not touch each other on the liquid crystal display device substrate; and discharging a plurality of second droplets onto a plurality of second positions on the liquid crystal display device substrate before the first droplets are dried, with the second positions being disposed between the first droplets that were discharged on the liquid crystal display device substrate so that the second droplets coalesce with a plurality of adjacent ones of the first droplets to form the liquid film.

6. A film formation method for discharging droplets of a functional liquid material from a plurality of nozzles arranged so as to trace scanning trajectories at a prescribed pitch with respect to a substrate by scanning relative to the substrate to form a liquid film on the substrate, the film formation method comprising:

discharging a plurality of first droplets from the nozzles so that the droplets do not touch each other on the substrate; and discharging a plurality of second droplets from the nozzles to a plurality of second positions between the first droplets before the first droplets are dried so that the second droplets coalesce with the first droplets discharged on the substrate, the discharging of the first droplets including discharging the first droplets at prescribed intervals in a scanning direction on the substrate, and the discharging of the second droplets including discharging the second droplets from the nozzles relating to adjacent ones of the scanning trajectories in different positions from each other with respect to the scanning direction.

7. The film formation method according to claim 6, wherein the discharging of the second droplets includes discharging the second droplets from the nozzles relating to adjacent ones of the scanning trajectories in positions that differ from each other by an amount corresponding to substantially half of the prescribed interval with respect to the scanning direction.

8. The film formation method according to claim 6, wherein the discharging of the first droplets include discharging the first droplets at the prescribed pitch and the prescribed interval that correspond to a distance in a range of one to two times a diameter of the first droplets upon the first droplets being discharged on the substrate.

9. An orientation film formation method for discharging droplets of a functional liquid material from a plurality of nozzles arranged so as to trace scanning trajectories at a prescribed pitch with respect to a liquid crystal display device substrate by scanning relative to the liquid crystal display device substrate to form a liquid film on the liquid crystal display device substrate, the orientation film formation method comprising:

discharging a plurality of first droplets from the nozzles so that the droplets do not touch each other on the liquid crystal display device substrate; and discharging a plurality of second droplets from the nozzles to a plurality of second positions between the first droplets before the first droplets are dried so that the second droplets coalesce with the first droplets discharged on the liquid crystal display device substrate, the discharging of the first droplets including discharging the first droplets at prescribed intervals in a scanning direction on the liquid crystal display device substrate, and the discharging of the second droplets including discharging the second droplets from the nozzles relating to adjacent ones of the scanning trajectories in different positions from each other with respect to the scanning direction.

* * * * *